Patented Aug. 6, 1946

2,405,189

UNITED STATES PATENT OFFICE 2,405,189

STABILIZED EXPLOSIVE

Le Roy V. Clark, New Castle, Pa., assignor to American Cyanamid & Chemical Corporation, New York, N. Y., a corporation of Delaware No Drawing. Application February 11, 1944, Serial No. 521,976

6 Claims. (Cl. 52—4)

The present invention relates to lead nitroaminoguanidine mixtures which are stable against auto-catalytic decomposition and to methods of producing such mixtures.

Lead nitroaminoguanidine, hereinafter referred to as LNAG, may be prepared according to U. S. Patent 2,251,101. It is coming into more and more extended use as a detonator, particularly adapted for use in electric blasting caps.

Study of LNAG has disclosed that in storage, over long periods of time, it has a tendency to give off ammonia. Unless this ammonia is either removed or disposed of or otherwise made unavailable, it has a tendency to catalytically cause further decomposition of the LNAG.

One of the factors which appear to promote decomposition, particularly in the presence of ammonia, is moisture. It is, therefore, desirable that the LNAG be stored or preserved under such conditions as to make any moisture present unavailable, either with or without ammonia, to cause catalytic decomposition.

The principal object of the present invention, therefore, is to provide a mixture including LNAG which is more stable under storage conditions than LNAG alone, yet without interfering with the desirable detonating properties of the LNAG.

After a complete study of the phenomena surrounding the decomposition of the LNAG and extensive experiments to determine materials which could be used to overcome the tendency for catalytic decomposition, it has been found that a stable mixture including LNAG may be obtained if there is mixed therewith requisite quantities of a heavy metal salt capable of taking on water and/or ammonia of constitution.

Among the compounds found suitable in this connection are the sulfates and nitrates of copper, cobalt and nickel, all in an anhydrous state. Anhydrous copper sulfate has shown itself to be far superior to any other material tried. The nitrates are preferred to sulfates generally, however, as they have been found to have less phlegmatizing action than the sulfates since the nitrate groups are a good source of oxygen.

As little as 0.1% of these anhydrous salts, when mixed with LNAG, have been found to be stable over long periods of time without giving off ammonia, which is the sign that decomposition is taking place. As much as 5% of the anhydrous salts may be used without undue phlegmatization.

In making the herein described mixtures, it is only necessary that a dried and powdered LNAG be carefully mixed with the requisite quantities of the powdered anhydrous salt, being careful that a thorough mixture results so that as far as possible, the anhydrous salt is completely and uniformly disseminated through the mixture.

Analysis of variously stored mixtures under varying conditions discloses that these anhydrous salts take on any ammonia given off in the first stages of decomposition and fix it as ammonia of constitution. The same holds true with any water vapor present. As a consequence, any tendency to further decompose through the auto-catalytic action of ammonia and/or water is prevented, thus stabilizing the mixture. Moreover, by using these compounds in the anhydrous state, one is able to determine whether decomposition has taken place to any material extent by a mere visual inspection thereof, for under these circumstances, the hydrated and/or ammoniated salt changes its color sufficiently to be detectable.

While the invention has been described with specific reference to particular embodiments, it is to be understood that it is not to be limited thereto but is to be construed broadly and restricted solely by the scope of the appended claims.

I claim:

1. A stable explosive mixture including LNAG and an anhydrous salt capable of taking on water and ammonia of constitution chosen from the group consisting of sulfates and nitrates of copper, nickel and cobalt.

2. The composition of claim 1 in which the salt is present in the proportion of from .1 to 5%.

3. The composition of claim 1 in which the salt is copper sulfate.

4. The method of preventing catalytic decomposition of LNAG due to moisture and ammonia, which includes the step of incorporating with LNAG a sufficient quantity of an anhydrous salt capable of taking on water and ammonia of constitution chosen from the group consisting of the sulfates and nitrates of copper, nickel and cobalt.

5. The method of claim 4 in which the salt is present in the proportion of from .1 to 5%.

6. The method of claim 4 in which the salt is copper sulfate.

LE ROY V. CLARK.